(12) United States Patent
Klett

(10) Patent No.: US 6,387,343 B1
(45) Date of Patent: *May 14, 2002

(54) PITCH-BASED CARBON FOAM AND COMPOSITES

(75) Inventor: James W. Klett, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/136,596

(22) Filed: Aug. 19, 1998

Related U.S. Application Data

(62) Division of application No. 08/921,875, filed on Sep. 2, 1997, now Pat. No. 6,033,506.

(51) Int. Cl.$^7$ ............................................. C01B 31/04
(52) U.S. Cl. ...................................... 423/448; 428/402
(58) Field of Search .......................... 423/448; 428/402

(56) References Cited

U.S. PATENT DOCUMENTS

| | | | |
|---|---|---|---|
| 2,401,797 A | 6/1946 | Rasmussen | 210/150.5 |
| 3,306,353 A | 2/1967 | Burne | 165/164 |
| 3,453,809 A | 7/1969 | Henderson | 55/269 |
| 3,558,276 A | 1/1971 | Otani | 264/29.6 X |
| 3,784,487 A | 1/1974 | Franck et al. | 260/2.5 F |
| 3,914,392 A | 10/1975 | Klett | 264/29 |
| 3,973,718 A | 8/1976 | Deschamps | 228/183 |
| 3,979,196 A | 9/1976 | Frank et al. | 65/25 |
| 4,005,183 A | 1/1977 | Singer | 423/447.2 |
| 4,007,324 A | 2/1977 | Wallouch | 13/18 |
| 4,025,689 A | 5/1977 | Kobayashi et al. | 428/402 |
| 4,096,097 A | 6/1978 | Yan | 252/510 |
| 4,125,676 A | 11/1978 | Maricle et al. | 429/38 |
| 4,205,055 A * | 5/1980 | Maire et al. | 423/448 |
| 4,225,463 A | 9/1980 | Unger et al. | 252/445 |
| 4,272,356 A | 6/1981 | Stiller et al. | 208/8 |
| 4,276,246 A | 6/1981 | Bonzom et al. | 264/53 |
| 4,303,431 A | 12/1981 | Torobin | 65/21.4 |
| 4,311,682 A | 1/1982 | Miyazaki et al. | 423/448 |
| 4,318,824 A | 3/1982 | Turner | 252/421 |
| 4,439,349 A | 3/1984 | Everett et al. | 502/180 |
| 4,442,165 A | 4/1984 | Gebhardt et al. | 428/307.7 |
| 4,487,687 A | 12/1984 | Simo et al. | 208/56 |
| 4,512,388 A | 4/1985 | Claar et al. | 165/1 |
| 4,518,483 A | 5/1985 | Dickakian | 208/44 |
| 4,525,492 A | 6/1985 | Rastall et al. | 521/181 |
| 4,550,015 A | 10/1985 | Korb et al. | 423/445 |
| 4,572,864 A | 2/1986 | Benson et al. | 428/305.5 |
| RE32,319 E | 12/1986 | Korb et al. | 423/445 |
| 4,637,906 A | 1/1987 | Fukuda et al. | 264/29.1 |
| 4,659,624 A | 4/1987 | Yaeger et al. | 428/408 |
| 4,775,655 A | 10/1988 | Edwards et al. | 502/416 |
| 4,782,586 A | 11/1988 | Joo et al. | 29/623.5 |
| 4,832,881 A | 5/1989 | Arnold, Jr. et al. | 264/29.7 |
| 4,873,071 A | 10/1989 | Yamada et al. | 423/448 |
| 4,873,218 A | 10/1989 | Pekala | 502/418 |
| 4,892,783 A | 1/1990 | Brazel | 428/282 |
| 4,917,835 A | 4/1990 | Lear et al. | 264/29.1 |
| 4,934,657 A | 6/1990 | Dodson | 251/214 |
| 4,978,649 A | 12/1990 | Surovikin et al. | 502/416 |
| 4,992,254 A | 2/1991 | Kong | 423/449 |
| 4,999,385 A | 3/1991 | McCullough, Jr. et al. | 521/149 |
| 5,019,164 A | 5/1991 | Tomita et al. | 106/22 |
| 5,047,225 A | 9/1991 | Kong | 423/447.2 |
| 5,053,148 A | 10/1991 | von Bonin | 252/8.05 |
| 5,071,631 A | 12/1991 | Takabatake | 423/445 |
| 5,076,845 A | 12/1991 | Seo et al. | 106/284.4 |
| 5,114,635 A | 5/1992 | Sohda et al. | 264/29.2 |
| 5,138,832 A | 8/1992 | Pande | 60/203.1 |
| 5,217,701 A | 6/1993 | Sakata et al. | 423/447.1 |
| 5,232,772 A | 8/1993 | Kong | 428/312.2 |
| 5,248,705 A | 9/1993 | McGuigan et al. | 521/149 |
| 5,300,272 A | 4/1994 | Simandl et al. | 423/445 |
| 5,384,193 A | 1/1995 | Suh et al. | 423/375 |
| 5,437,927 A | 8/1995 | Ross et al. | 428/367 |
| 5,487,946 A | 1/1996 | McGinniss et al. | 428/413 |

(List continued on next page.)

OTHER PUBLICATIONS

Hexcel Product Data Sheet (1997).

Kearns, Kris, Graphitic Carbon Foam Processing, 21st Annual Conference on Composites, Materials, and Structures, Jan. 26–31, 1997, Cocoa Beach, FL, pp. 835–847 (1997).

Lake, Max L., Simple Process Produces High Modulus Carbon Fibers at Much Lower Cost, Mat. Tech., 11 (4), pp. 137–139 (1996).

Jones, S. P., Fain, C. C., and Edie, D. C., Structural Development in Mesophase Pitch Based Carbon Fibers Produced from Naphthalene, 35 (10), pp. 1533–1543 (1997).

Amoco Product Literature (1997).

Steiner, K., Banhart, J., Baumeister, J. and Weber, M., Production and Properties of Ultra–Lightweight Aluminum Foams for Industrial Applications, Proceeding from the 4th International Conference on Composites Engineering, Edited by David Hui, pp. 943–944 (1997).

Inoue, K., Application of laser flash method of penetrative materials for measurement of thermal diffusivity, High Temp. Tech., 8 (1), pp. 21–26 (1990).

Cowan, R. D., Pulse Method of Measuring Thermal Diffusivity at High Temperatures, J. of App. Phys., 34 (4), pp. 926–927 (1962).

(List continued on next page.)

*Primary Examiner*—Stuart L. Hendrickson
(74) *Attorney, Agent, or Firm*—Ackerman Senterfitt & Eidson, P.A.

(57) ABSTRACT

A process for producing carbon foam or a composite is disclosed which obviates the need for conventional oxidative stabilization. The process employs mesophase or isotropic pitch and a simplified process using a single mold. The foam has a relatively uniform distribution of pore sizes and a highly aligned graphic structure in the struts. The foam material can be made into a composite which is useful in high temperature sandwich panels for both thermal and structural applications.

65 Claims, 10 Drawing Sheets

U.S. PATENT DOCUMENTS

| | | | |
|---|---|---|---|
| 5,540,903 A | | 7/1996 | Romine ..................... 423/445 |
| 5,556,892 A | | 9/1996 | Pekala ....................... 521/181 |
| 5,578,255 A | | 11/1996 | Okuyama et al. .......... 264/29.5 |
| 5,580,500 A | | 12/1996 | Muramatsu et al. ........ 264/29.1 |
| 5,582,781 A | | 12/1996 | Hayward ..................... 264/28 |
| 5,614,134 A | | 3/1997 | Sohda et al. ............... 264/29.1 |
| 5,695,816 A | | 12/1997 | Iwashita et al. ............. 427/228 |
| 5,705,106 A | | 1/1998 | Kolesnikov et al. ....... 264/29.1 |
| 5,709,914 A | | 1/1998 | Hayes ....................... 428/35.1 |
| 5,733,484 A | | 3/1998 | Uchida et al. .............. 264/29.1 |
| 5,770,127 A | | 6/1998 | Abrams et al. ............ 264/29.1 |
| 5,868,974 A | | 2/1999 | Kearns |
| 5,882,621 A | | 3/1999 | Doddapaneni et al. |
| 5,888,430 A | * | 3/1999 | Wakayama et al. ......... 423/448 |
| 5,888,469 A | | 3/1999 | Stiller et al. ................ 423/445 |
| 5,902,562 A | | 5/1999 | Lagasse et al. |
| 5,945,084 A | | 8/1999 | Droege |
| 5,954,937 A | | 9/1999 | Farmer |
| 6,013,371 A | | 1/2000 | Hager et al. |
| 6,033,506 A | | 3/2000 | Klett |
| 6,037,032 A | | 3/2000 | Klett et al. |
| 6,039,032 A | * | 3/2000 | Klett ............................ 428/71 |
| 6,126,874 A | | 10/2000 | Dillon et al. ............... 264/29.7 |

OTHER PUBLICATIONS

Ohlhorst, C., Vaughn, W., Ransone, P., and Tsou, H., Thermal Conductivity Database of Various Structural Carbon–Carbon Composite Materials, Japan Welding Soc., 561, pp. 38–42 (1987).

Rajeev Mehta et al., "Graphite Carbon Foams: Processing and Characterization", 21st Biennial Conference on Carbon, Conf. Proceedings, American Carbon Society, Buffalo, New York, pp. 104–105, 1993, no month.

XP–002080696—Patent Abstracts of Japan, vol. 014, No. 386 (C–0750), Aug. 21, 1990 and JP 02 142891 A (Kawasaki Steel Corp.), May 31, 1990.

Klett, J.W., et al., "Flexible Towpreg for the Fabrication of High Thermal Conductivity Carbon/Carbon Composites", Carbon, vol. 33, No. 10, pp. 1485–1503 (1995) No month.

Edie, D.D., "Pitch and Mesophase Fibers", pp. 1–30 (1990) (from *Carbon Fiber and Filaments*, J.L. FIgueiredo, Ed., Kluwar Academic Publishers).

Hager, J., et al., "Idealized Ligament Formation and Geometry in Open–Celled Foams," 21$^{st}$ Bienniel Conference on Carbon Extended Abstracts, pp. 102 (1993).

Hager, J., et al., "Progress in Open–Celled Carbon Foams," 40$^{th}$ International Sampe Symposium, Anaheim, CA (May 8–11, 1995).

*Introduction to Carbon Science*, ed. Harry Marsh, Butterworths and Co., Ltd., London, pp. 6–16, 39–44, 47–49, 51–52, 55–58, 61 and 109 (1989).

Brooks and Taylor, "The Formation of Graphitizable Carbons from the Liquid Phase," *Carbon*, 3(2), pp. 185–193 (1965).

Rouzaud, J.N. and Oberlin, A., "Structure, Microtexture and Opitcal Properties of Anthracene and Saccharose–based Carbons," *Carbon*, 27(4), pp. 517–529 (1989).

Rand, B., "Matrix Precursors for Carbon–Carbon Composites," in *Essentials of Carbon–Carbon Composites*, edited by C.R. Thomas, Royal Society of Chemistry, London pp. 67–102 (1993).

Kelly, B.T., "The Thermal Conductivity of Graphite," *Physics and Chemistry of Carbon*, 5, pp. 119–215 (1969).

P.M. Adams, H.A. Katzman, G.S. Rellick, and G. W. Stupian, "Characterization of High Thermal Conductivity Carbon Fibers and a Self–Reinforced Graphite Panel," Aerospace Report No. TR–98–(8565)–11, Contract No. FO4701–93–C–0094, Report Date Sep. 1, 1998.

Ultramet Product Literature, 1998 (for Ultrfoam$_c$).

Japan Patent Publication No. 04163319, published Jun. 8, 1992 (one page English abstract from European Patent Office).

Klett, J. and Edie, D., "Flexible Towpreg for the Fabrication of High Thermal Conductivity for Carbon/Carbon Composities,".

Shih, Wei, "Development of Carbon–Carbon Composites for Electronic Thermal Management Applications," IDA Workshop, May 3–5, 1994, pp. III–119–III–136.

A.R. Phillips Laboratory Contract No. F29601–93–C–0165 and Engle, G.B., "High Thermal Conductivity C/C Composites for Thermal Management," IDA Workshop, May 3–5, 1994, pp. III–137–III–148.

Hager, Joseph W. and Max L. Lake, "Novel Hybrid Composites Based on Carbon Foams," Mat. Res. Soc. Symp., Materials Research Society, 270:29–34 (1992).

Sandhu, S.S. and J.W. Hager, "Formulation of a Mathematical Process Model Process Model for the Foaming of a Mesophase Carbon Precursor," Mat. Res. Soc. Symp., Materials Research Society, 270:35–40 (1992).

Gibson, L.J. and M.F. Ashby, "Cellular Solids: Structure & Properties," pp. 1–277, Pergamon Press, New York (1988).

Gibson, L.J., "Modeling the Mechanical Behavior of Cellular Materials", Mat. Sci. and Eng. A110, pp. 1–36 (1989).

Knippenberg, W.F. and B. Lersmacher, "Carbon Foam," Phillips Tech. Rev., pp. 93–103 (1976).

White, J.L. and P.M. Scheaffer, "Pitch–Based Processing of Carbon–Carbon Composites," Carbon 27: pp. 697–707 (1989). No month.

Hager, Joseph W., "Idealized Strut Geometries for Open–Celled Foams," Mat. Res. Soc. Symp., Materials Research Society, 270:41–46 (1992), No month.

Aubert, J.W., MRS Symposium Proceedings, "Microcellular Foams Prepared from Demixed Polymer Solutions," 207:117–127 (1991), No month.

Cowlard, F.C. and J.C. Lewis, "Vitreous Carbon—A New Form of Carbon," J. of Mat. Sci. 2:507–512 (1967), No month.

Noda, T., M. Inagaki and S. Yamada, "Glass–like Carbons," J. of Non–Crystalline Solids, 1:285–302 (1969), No month.

Davies, G.J. and Zhen, Shu "Review: Metallic Foams: Their Production, Properties and Applications," J. of Mat. Sci. 18: pp. 1899–1911 (1983), No month.

Dan D. Edie, "Pitch And Mesophase Fibers", (1990) pp. 1–30.

* cited by examiner

FOAM PRODUCED IN BOTTOM OF SODA CAN.

FOAM PRODUCED IN ALUMINUM WEIGHING DISH.

FOAM REMOVED FROM ALUMINUM WEIGHING DISH AND TURNED OVER, EXPOSING SMOOTH INTEGRATED SURFACE (FACE)

PITCH-BASED CARBON FOAM AND COMPOSITES

CROSS-REFERENCE TO RELATED APPLICATIONS

This application is a divisional of application Ser. No. 08/721,875 filed Sep. 2, 1997, now U.S. Pat. No. 6,033,506.

STATEMENT REGARDING FEDERALLY SPONSORED RESEARCH OR DEVELOPMENT

The United States Government has rights in this invention pursuant to contract No. DE-AC05-96OR22464 between the United States Department of Energy and Lockheed Martin Energy Research Corporation.

BACKGROUND OF THE INVENTION

The present invention relates to carbon foam and composites, and more particularly to a process for producing them.

The extraordinary mechanical properties of commercial carbon fibers are due to the unique graphitic morphology of the extruded filaments. See Edie, D. D., "Pitch and Mesophase Fibers," in *Carbon Fibers, Filaments and Composites*, Figueiredo (editor), Kluwer Academic Publishers, Boston, pp. 43–72 (1990). Contemporary advanced structural composites exploit these properties by creating a disconnected network of graphitic filaments held together by an appropriate matrix. Carbon foam derived from a pitch precursor can be considered to be an interconnected network of graphitic ligaments or struts, as shown in FIG. 1. As such interconnected networks, they represent a potential alternative as a reinforcement in structural composite materials.

Recent developments of fiber-reinforced composites has been driven by requirements for improved strength, stiffness, creep resistance, and toughness in structural engineering materials. Carbon fibers have led to significant advancements in these properties in composites of various polymeric, metal, and ceramic matrices.

However, current applications of carbon fibers has evolved from structural reinforcement to thermal management in application ranging from high density electronic modules to communication satellites. This has simulated research into novel reinforcements and composite processing methods. High thermal conductivity, low weight, and low coefficient of thermal expansion are the primary concerns in thermal management applications. See Shih, Wei, "Development of Carbon-Carbon Composites for Electronic Thermal Management Applications," IDA Workshop, May 3–5, 1994, supported by AF Wright Laboratory under Contract Number F33615-93-C-2363 and AR Phillips Laboratory Contract Number F29601-93-C-0165 and Engle, G. B., "High Thermal Conductivity C/C Composites for Thermal Management," IDA Workshop, May 3–5, 1994, supported by AF Wright Laboratory under Contract F33615-93-C-2363 and AR Phillips Laboratory Contract Number F29601-93-C-0165. Such applications are striving towards a sandwich type approach in which a low density structural core material (i.e. honeycomb or foam) is sandwiched between a high thermal conductivity facesheet. Structural cores are limited to low density materials to ensure that the weight limits are not exceeded. Unfortunately, carbon foams and carbon honeycomb materials are only available materials for use in high temperature applications (>1600° C.). High thermal conductivity carbon honeycomb materials are extremely expensive to manufacture compared to low conductivity honeycombs, therefore, a performance penalty is paid for low cost materials. High conductivity carbon foams are also more expensive to manufacture than low conductivity carbon foams, in part, due to the starting materials.

In order to produce high stiffness and high conductivity carbon foams, invariably, a pitch must be used as the precursor. This is because pitch is the only precursor which forms a highly aligned graphitic structure which is a requirement for high conductivity. Typical processes utilize a blowing technique to produce a foam of the pitch precursor in which the pitch is melted and passed from a high pressure region to a low pressure region. Thermodynamically, this produces a "Flash," thereby causing the low molecular weight compounds in the pitch to vaporize (the pitch boils), resulting in a pitch foam. See Hagar, Joseph W. and Max L. Lake, "novel Hybrid Composites Based on Carbon Foams," *Mat. Res. Soc. Symp.*, Materials Research Society, 270:29–34 (1992), Hagar, Joseph W. and Max L. Lake, "Formulation of a Mathematical Process Model Process Model for the Foaming of a Mesophase Carbon Precursor," *Mat. Res. Soc. Symp.*, Materials Research Society, 270:35–40 (1992),Gibson, L. J. and M. F. Ashby, *Cellular Solids: Structures & Properties*, Pergamon Press, New York (1988), Gibson, L. J., Mat. Sci. and Eng A110, 1 (1989), Knippenberg and B. Lersmacher, Phillips Tech. Rev., 36(4), (1976), and Bonzom, A., P. Crepaux and E. J. Moutard, U.S. Pat. No. 4,276,246, (1981). Then, the pitch foam must be oxidatively stabilized by heating in air (or oxygen) for many hours, thereby, cross-linking the structure and "setting" the pitch so it does not melt during carbonization. See Hagar, Joseph W. and Max L. Lake, "Formulation of a Mathematical Process Model Process Model for the Foaming of a Mesophase Carbon Precursor," *Mat. Res. Soc. Symp.*, Materials Research Society, 270:35–40 (1992) and White, J. L., and P. M. Shaeffer, Carbon, 27:697 (1989). This is a time consuming step and can be an expensive step depending on the part size and equipment required. The "set" or oxidized pitch is then carbonized in an inert atmosphere to temperatures as high as 1100° C. Then, graphitization is performed at temperatures as high as 3000° C. to produce a high thermal conductivity graphitic structure, resulting in a stiff and very thermally conductive foam.

other techniques utilize a polymeric precursor, such as phenolic, urethane, or blends of these with pitch. See Hagar, Joseph W. and Max L. Lake, "Idealized Strut Geometries for Open-Celled Foams," *Mat. Res. Soc. Symp.*, Materials Research Society, 270:41–46 (1992), Aubert, J. W., (MRS Symposium Proceedings, 207:117–127 (1990), Cowlard, F. C. and J. C. Lewis, *J. of Mat. Sci.*, 2:507–512 (1967) and Noda, T., Inagaki and S. Yamada, *J. of Non-Crystalline Solids*, 1:285–302, (1969). High pressure is applied and the sample is heated. At a specified temperature, the pressure is released, thus causing the liquid to foam as volatile compounds are released. The polymeric precursors are cured and then carbonized without a stabilization step. However, these precursors produce a "glassy" or vitreous carbon which does not exhibit graphitic structure and, thus, has low thermal conductivity and low stiffness. See Hagar, Joseph W. and Max L. Lake, "Idealized Strut Geometries for Open-Celled Foams," *Mat. Res. Soc. Symp.*, Materials Research Society, 270:41–46 (1992).

In either case, once the foam is formed, it is then bonded in a separate step to the facesheet used in the composite. This can be an expensive step in the utilization of the foam.

The process of this invention overcomes these limitations, by not requiring a "blowing" or "pressure release" technique to produce the foam. Furthermore, an oxidation stabilization step is not required, as in other methods used to produce pitch-based carbon foams with a highly aligned graphitic structure. This process is less time consuming, and therefore, will be lower in cost and easier to fabricate.

Lastly, the foam can be produced with an integrated sheet of high thermal conductivity carbon on the surface of the foam, thereby producing a carbon foam with a smooth sheet on the surface to improve heat transfer.

SUMMARY OF THE INVENTION

The general object of the present invention is to provide carbon foam and a composite from a mesophase or isotropic pitch such as synthetic, petroleum or coal-tar based pitch.

Another object is to provide a carbon foam and a composite from pitch which does not require an oxidative stabilization step.

These and other objectives are accomplished by a method of producing carbon foam wherein an appropriate mold shape is selected and preferably an appropriate mold release agent is applied to walls of the mold. Pitch is introduced to an appropriate level in the mold, and the mold is purged of air such as by applying a vacuum. Alternatively, an inert fluid could be employed. The pitch is heated to a temperature sufficient to coalesce the pitch into a liquid which preferably is of about 50° C. to about 100° C. above the softening point of the pitch. The vacuum is released and an inert fluid applied at a static pressure up to about 1000 psi. The pitch is heated to a temperature sufficient to cause gases to evolve and foam the pitch. The pitch is further heated to a temperature sufficient to coke the pitch and the pitch is cooled to room temperature with a simultaneous and gradual release of pressure.

In another aspect, the previously described steps are employed in a mold composed of a material such that the molten pitch does not wet.

In yet another aspect, the objectives are accomplished by the carbon foam product produced by the methods disclosed herein including a foam product with a smooth integral facesheet.

In still another aspect a carbon foam composite product is produced by adhering facesheets to a carbon foam produced by the process of this invention.

DETAILED DESCRIPTION OF THE INVENTION

In order to illustrate the carbon foam product and composite of this invention, the following Examples are set forth. They are not intended to limit the invention in any way.

EXAMPLE I

Pitch powder, granules, or pellets are placed in a mold with the desired final shape of the foam. These pitch materials can be solvated if desired. In this Example Mitsubishi ARA-24 mesophase pitch was utilized. A proper mold release agent or film is applied to the sides of the mold to allow removal of the part. In this case, Boron Nitride spray and Dry Graphite Lubricant were separately used as a mold release agent. If the mold is made from pure aluminum, no mold release agent is necessary since the molten pitch does not wet aluminum and, thus, will not stick to the mold. Similar mold materials may be found that the pitch does not wet and, thus, they will not need mold release. The sample is evacuated to less than 1 torr and then heated to a temperature approximately 50 to 100° C. above the softening point. In this case where Mitsubishi ARA24 mesophase pitch was used, 300° C. was sufficient. At this point, the vacuum is released to a nitrogen blanket and then a pressure of up to 1000 psi is applied. The temperature of the system is then raised to 800° C., or a temperature sufficient to coke the pitch which is 500° C. to 1000° C. This is performed at a rate of no greater than 5° C./min. and preferably at about 2 ° C./min. The temperature is held for at least 15 minutes to achieve an assured soak and then the furnace power is turned off and cooled to room temperature. Preferably the foam was cooled at a rate of approximately 1.5° C./min. with release of pressure at a rate of approximately 2 psi/min. Final foam temperatures for three product runs were 500° C., 630° C. and 800° C. During the cooling cycle, pressure is released gradually to atmospheric conditions. The foam was then heat treated to 1050° C. (carbonized) under a nitrogen blanket and then heat treated in separate runs to 2500° C. and 2800° C. (graphitized) in Argon.

Figure 1:
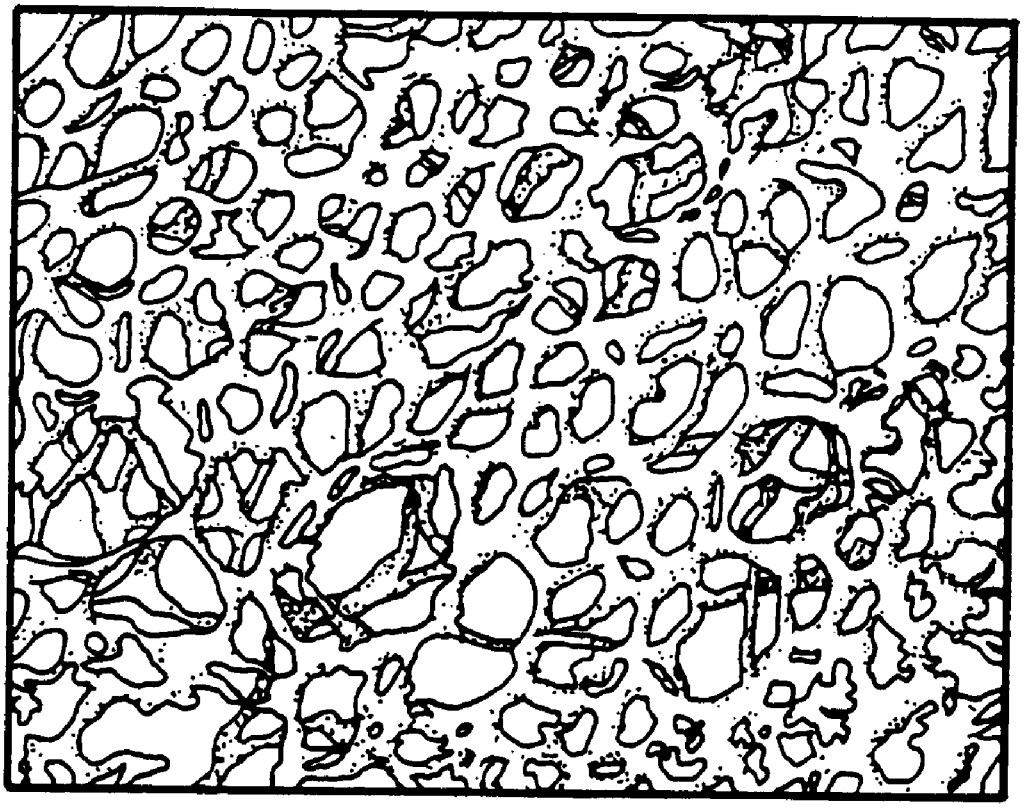
FIG. 1 is a micrograph illustrating typical carbon foam with interconnected carbon ligaments and open porosity.
Figure 2:
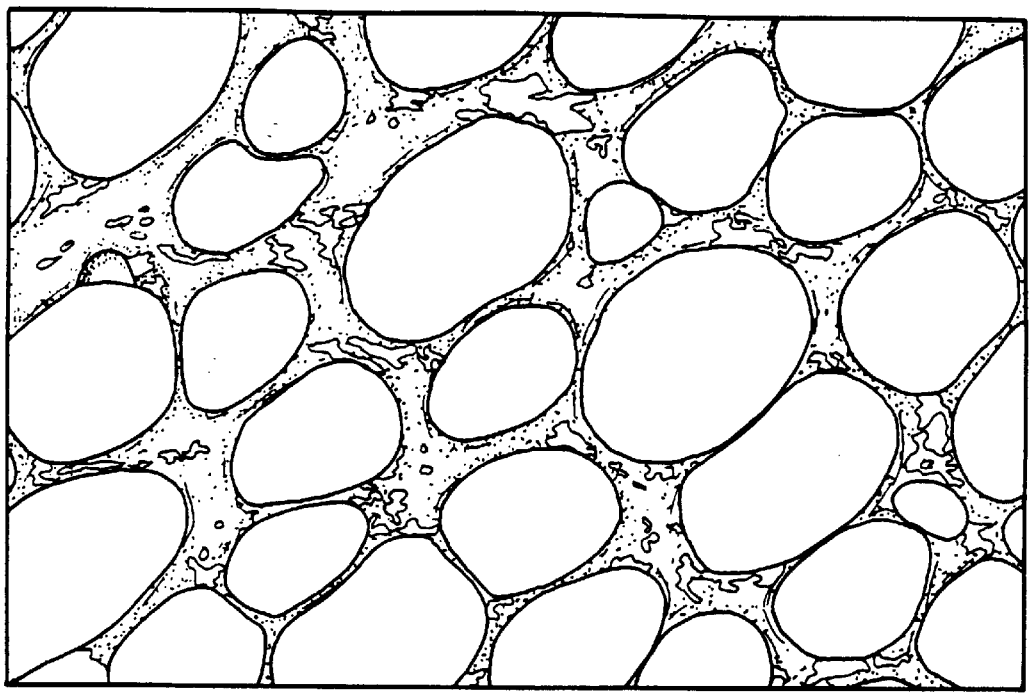
FIGS. 2–6 are micrographs of pitch-derived carbon foam graphitized at 2500° C. and at various magnifications.
Figure 3:
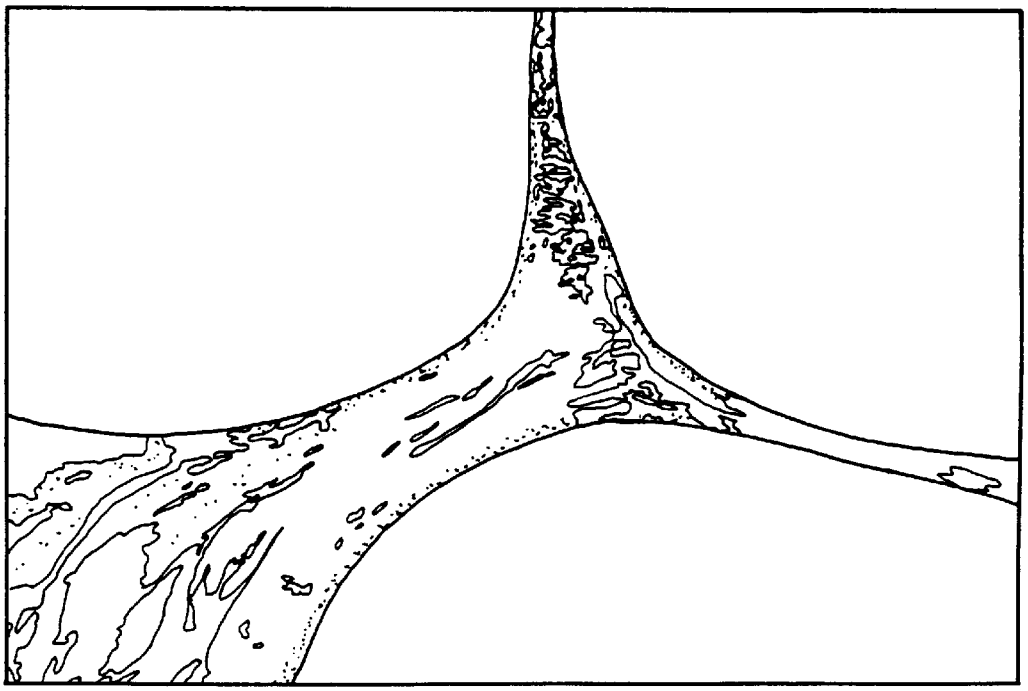
Figure 4:
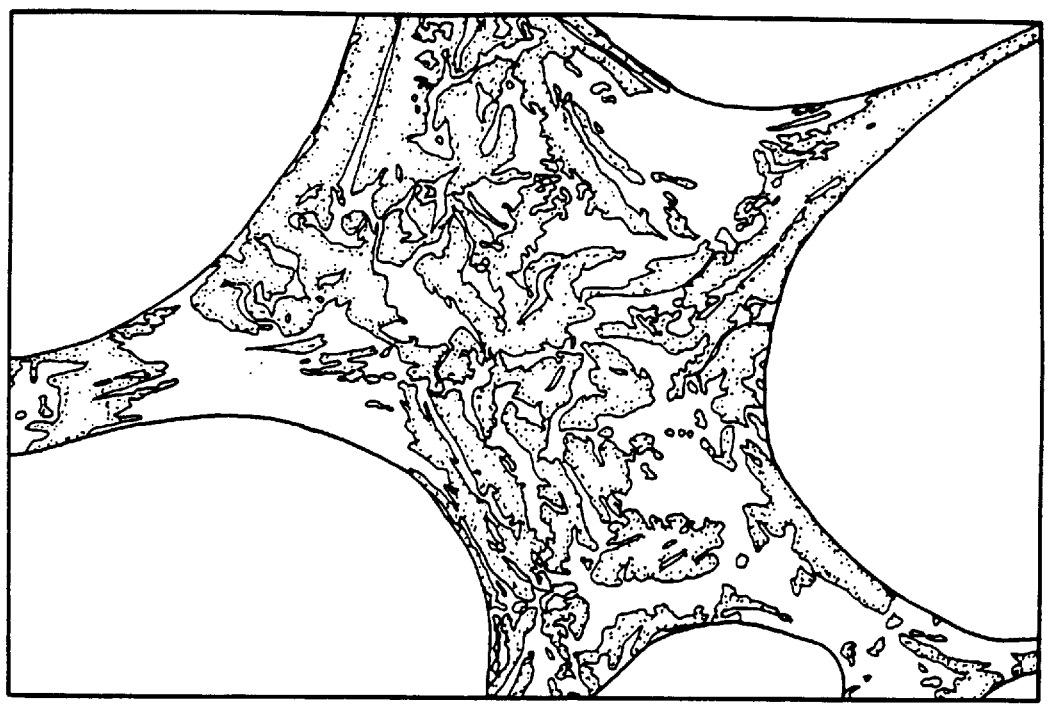
Figure 5:
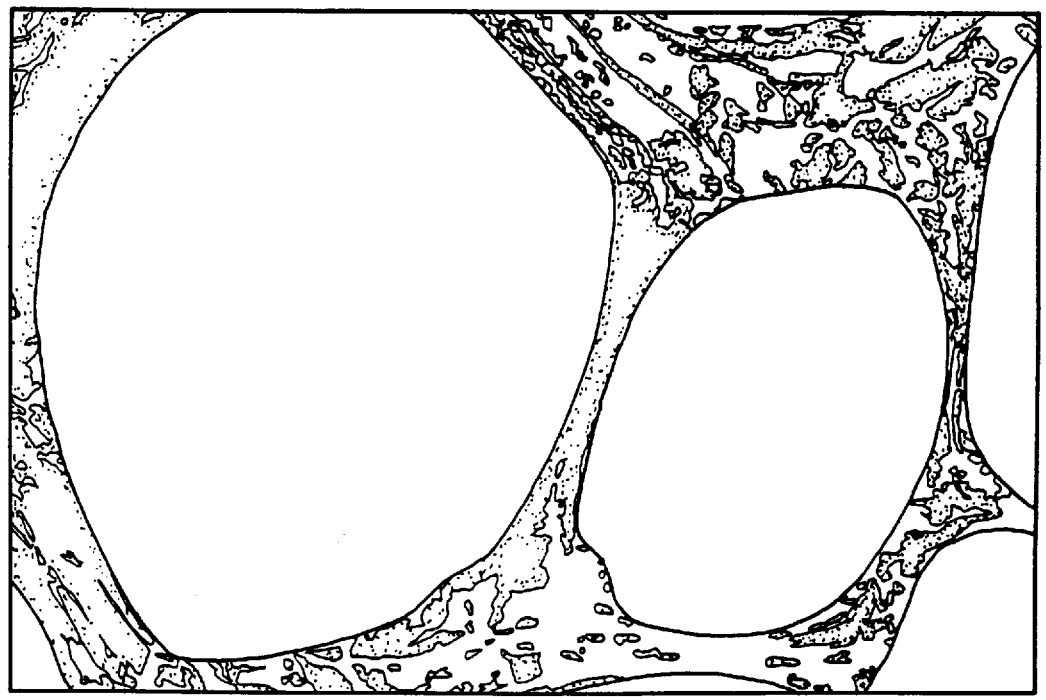
Figure 6:
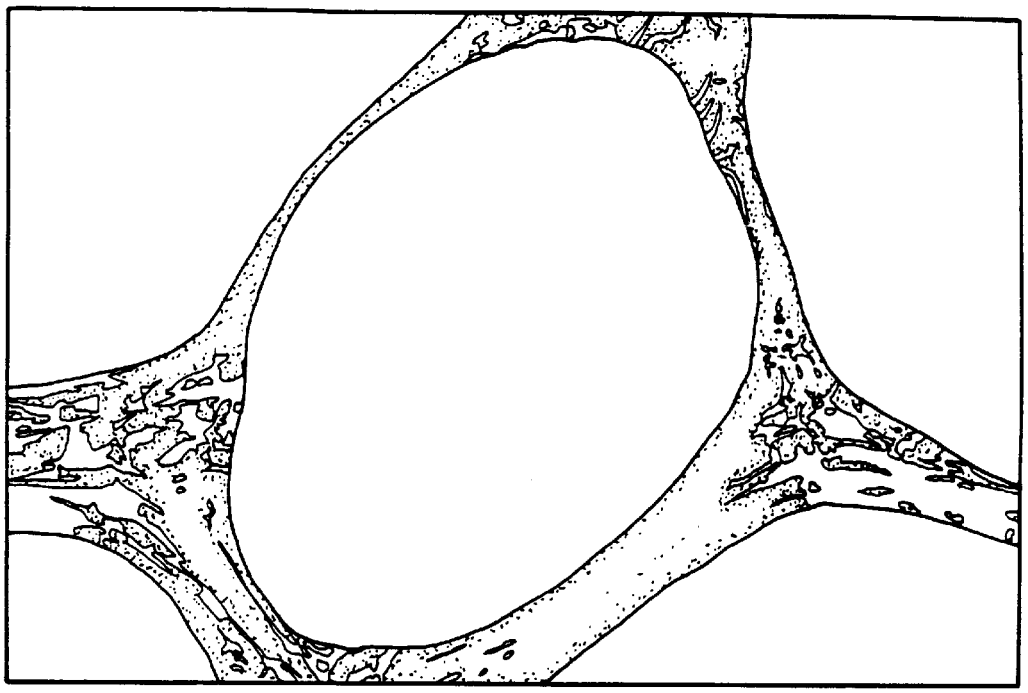
Figure 7:
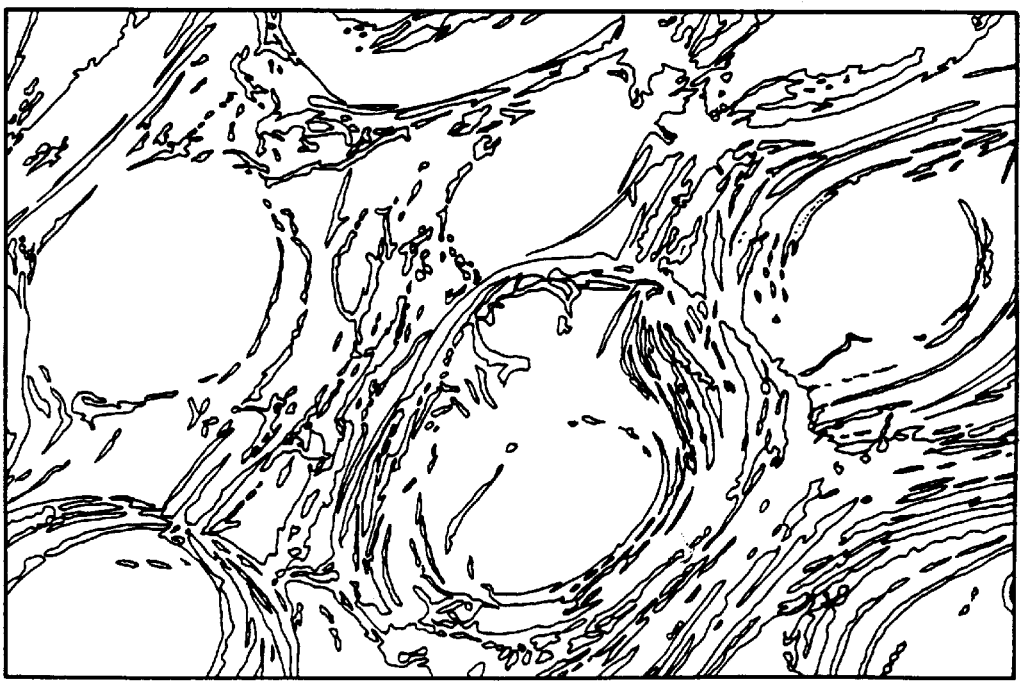
FIG. 7 is a SEM micrograph of the foam produced by the process of this invention.
Figure 8:
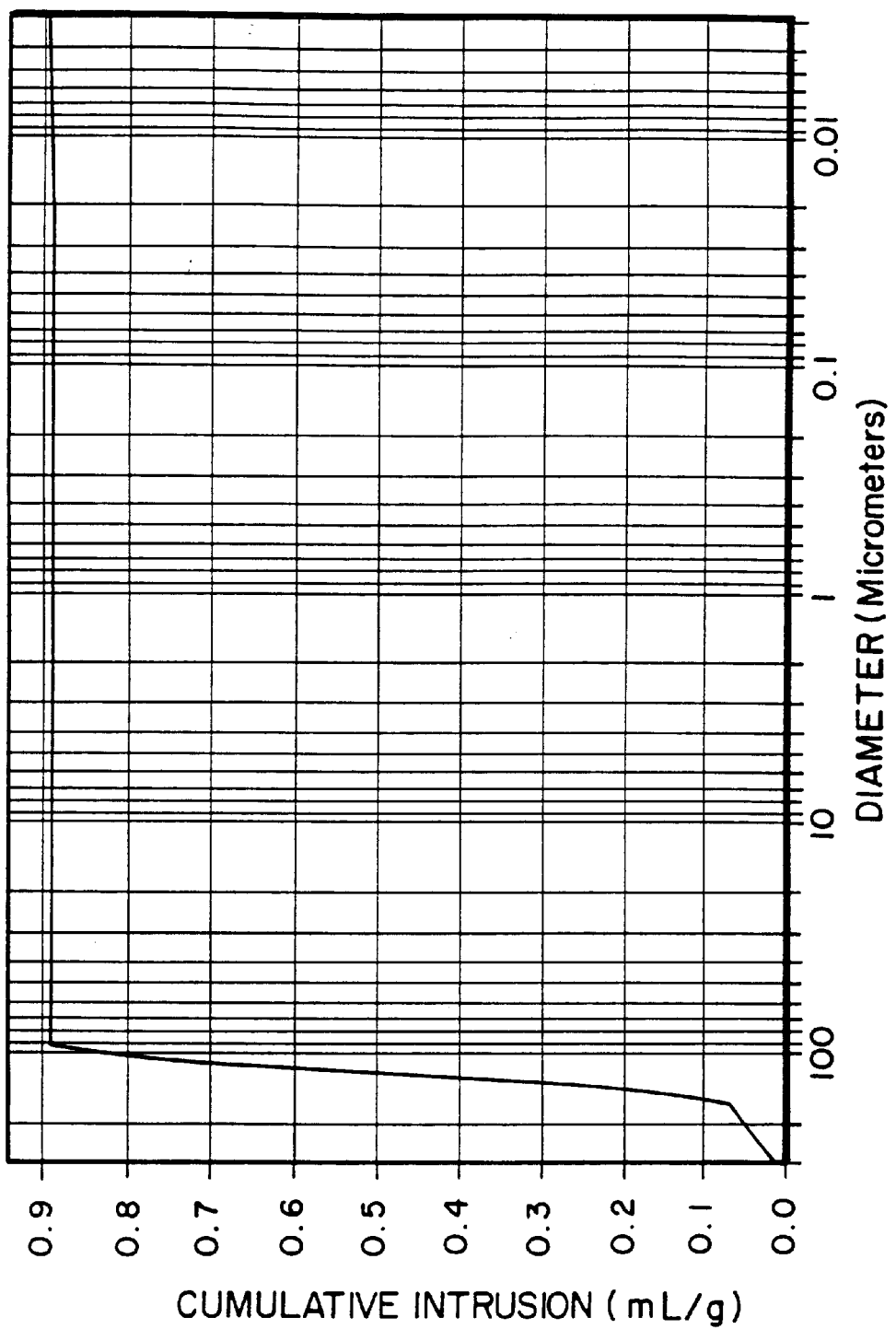
FIG. 8 is a chart illustrating cumulative intrusion volume versus pore diameter.
Figure 9:
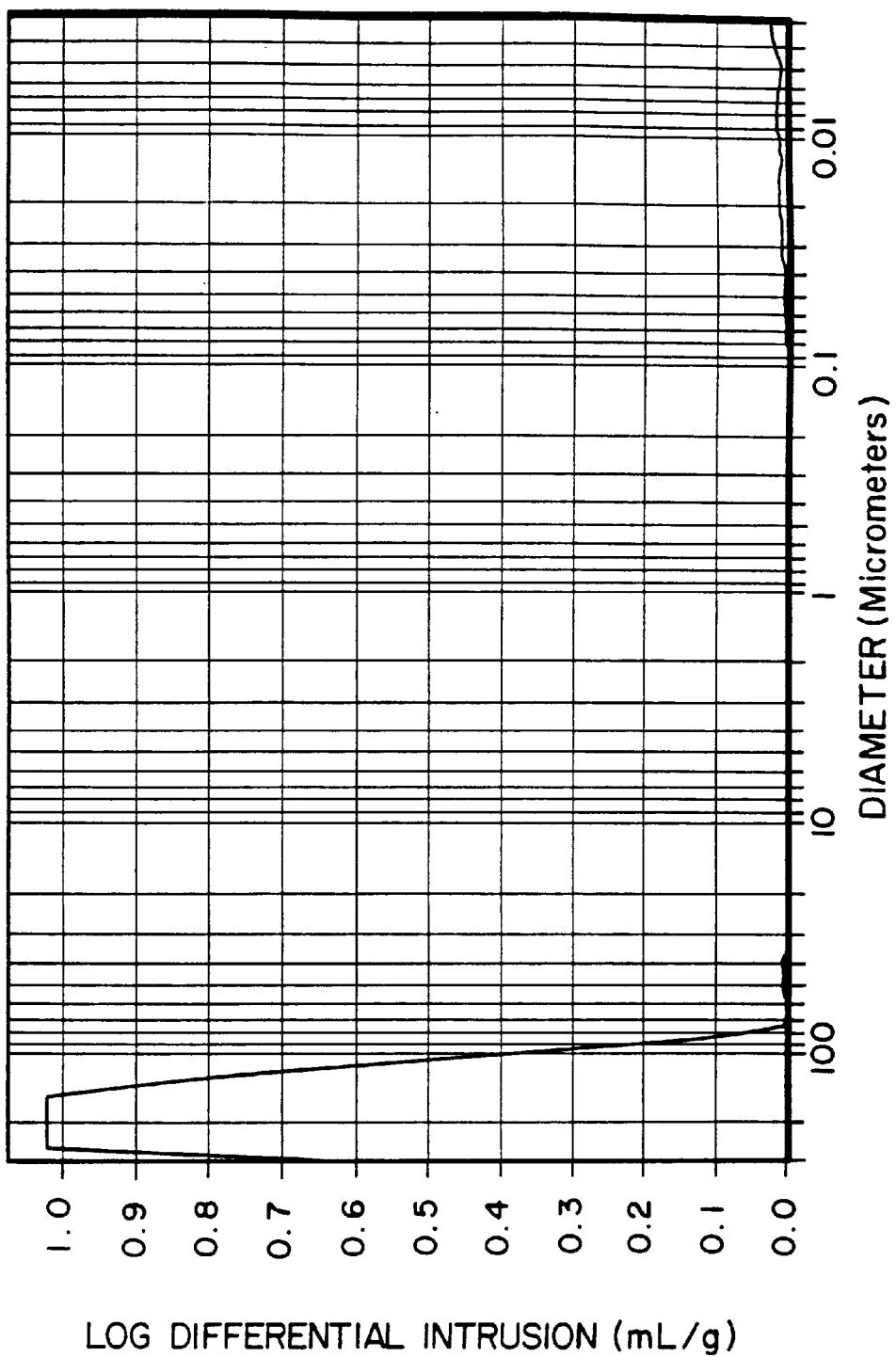
FIG. 9 is a chart illustrating log differential intrusion volume versus pore diameter.

Carbon foam produced with this technique was examined with photomicrography, scanning electron microscopy (SEM), X-ray analysis, and mercury porisimetry. As can be seen in the FIGS. 2–7, the interference patterns under cross-polarized light indicate that the struts of the foam are completely graphitic. That is, all of the pitch was converted to graphite and aligned along the axis of the struts. These struts are also similar in size and are interconnected throughout the foam. This would indicate that the foam would have high stiffness and good strength. As seen in FIG. 7 by the SEM micrograph of the foam, the foam is open cellular meaning that the porosity is not closed. FIGS. 8 and 9 are results of the mercury porisimetry tests. These tests indicate that the pore sizes are in the range of 90–200 microns.

Figure 10:
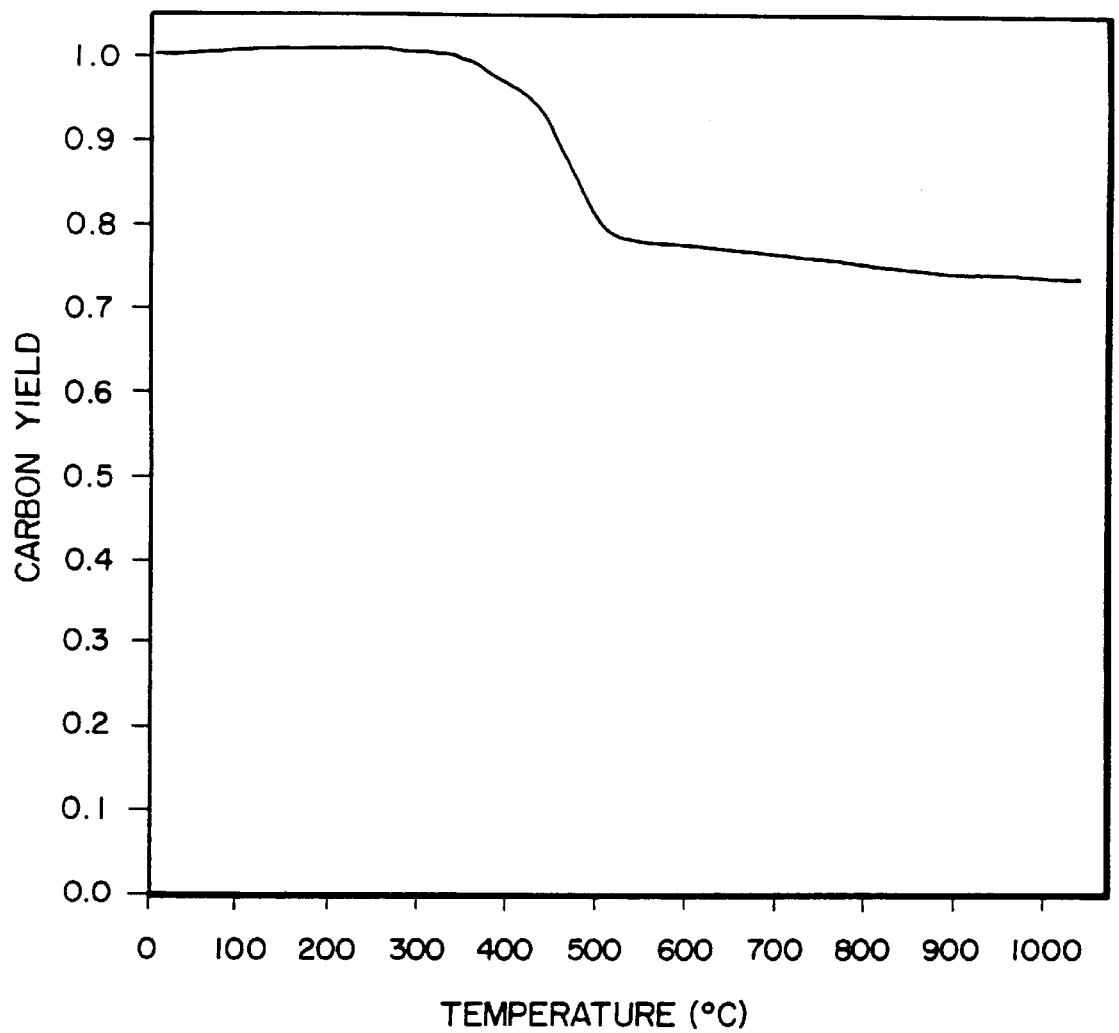
FIG. 10 is a graph illustrating the temperatures at which volatiles are given off from raw pitch.

A thermogravimetric study of the raw pitch was performed to determine the temperature at which the volatiles are evolved. As can be seen in FIG. 10, the pitch loses nearly 20% of its mass fairly rapidly in the temperature range between about 420° C. and about 480° C. Although this was performed at atmospheric pressure, the addition of 1000 psi pressure will not shift this effect significantly. Therefore, while the pressure is at 1000 psi, gases rapidly evolved during heating through the temperature range of 420° C. to 480° C. The gases produce a foaming effect (like boiling) on the molten pitch. As the temperature is increased further to temperatures ranging from 500° C. to 1000° C. (depending on the specific pitch), the foamed pitch becomes coked (or rigid), thus producing a solid foam derived from pitch. Hence, the foaming has occurred before the release of pressure and, therefore, this process is very different from previous art.

Samples from the foam were machined into specimens for measuring the thermal conductivity. The bulk thermal conductivity ranged from 58 W/m·K to 106 W/m·K. The average density of the samples was 0.53 g/cm$^3$. When weight is taken into account, the specific thermal conductivity of the pitch derived foam is over 4 times greater than that of copper. Further derivations can be utilized to estimate the thermal conductivity of the struts themselves to be nearly 700 W/m·K. This is comparable to high thermal conductivity carbon fibers produced from this same ARA24 mesophase pitch.

Figure 11:
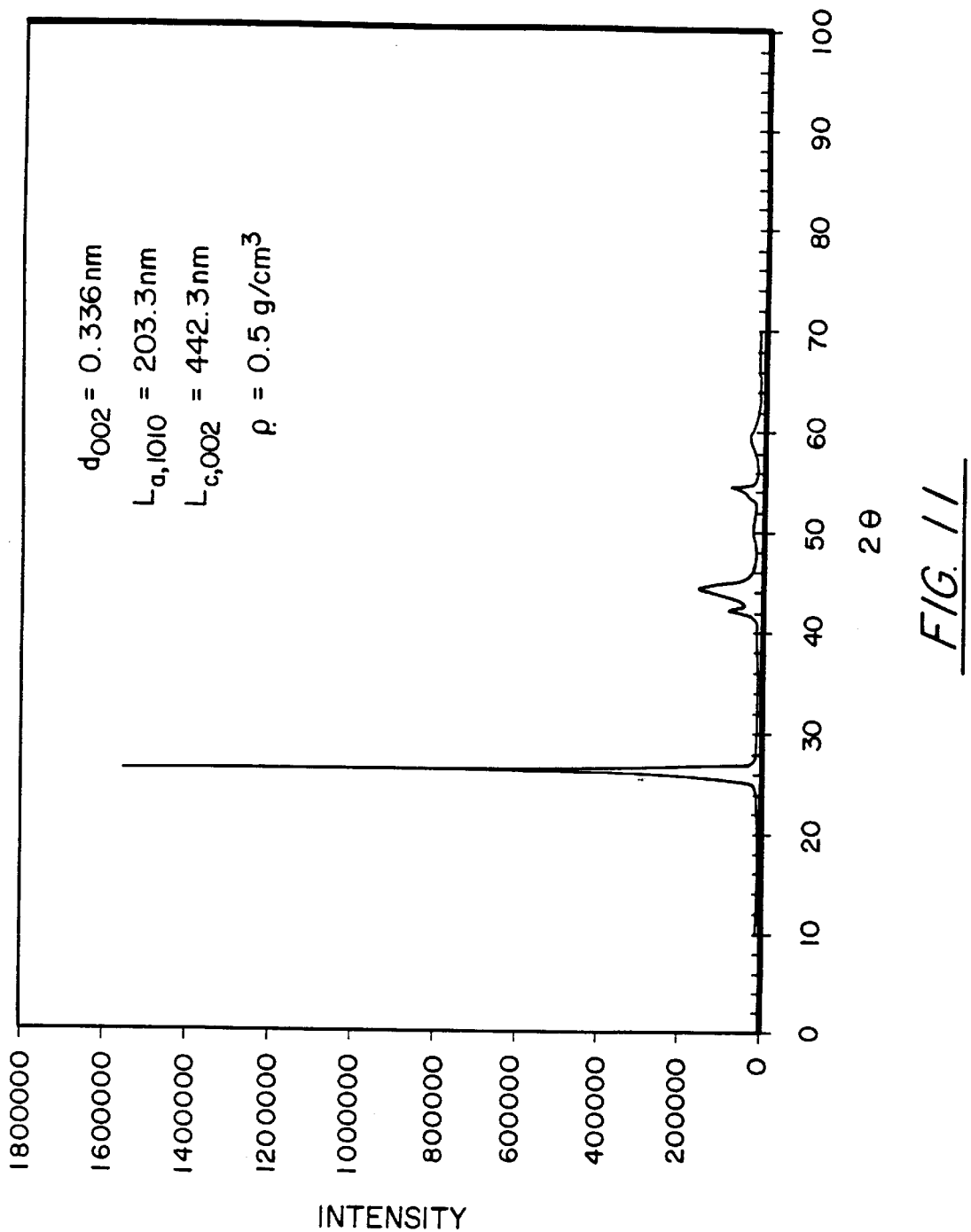
FIG. 11 is an X-ray analysis of the graphitized foam produced by the process of this invention.

X-ray analysis of the foam was performed to determine the crystalline structure of the material. The x-ray results are shown in FIG. 11. From this data, the graphene layer spacing ($d_{002}$) was determined to be 0.336 nm. The coherence length (La, 1010) was determined to be 203.3 nm and the stacking height was determined to be 442.3 nm.

The compression strength of the samples were measured to be 3.4 MPa and the compression modulus was measured to be 73.4 MPa. The foam sample was easily machined and could be handled readily without fear of damage, indicating a good strength.

It is important to note that when this pitch is heated in a similar manner, but under only atmospheric pressure, the pitch foams dramatically more than when under pressure. In fact, the resulting foam is so fragile that it could not even be handled to perform tests.

EXAMPLE II

An alternative to the method of Example I is to utilize a mold made from aluminum. In this case two molds were used, an aluminum weighing dish and a sectioned soda can. The same process as set forth in Example I is employed except that the final coking temperature was only 630° C., so as to prevent the aluminum from melting.

Figure 12A:
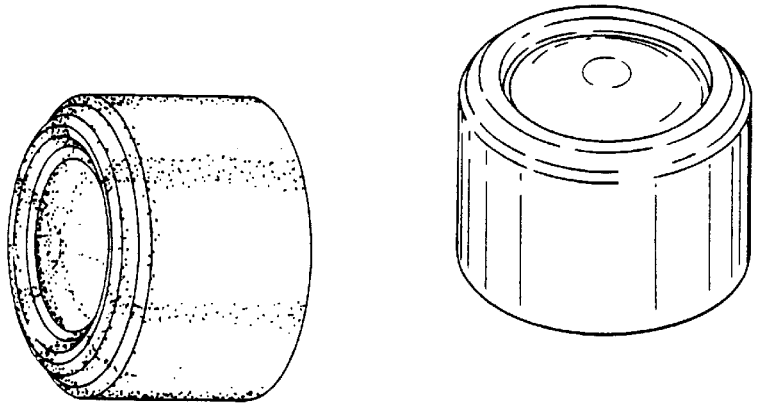
FIGS. 12A–C are photographs illustrating foam produced with aluminum crucibles and the smooth structure or face sheet that develops.
Figure 12B:
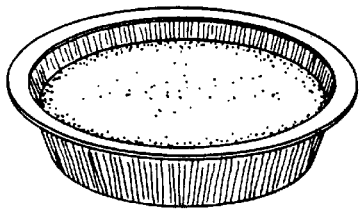
Figure 12C:
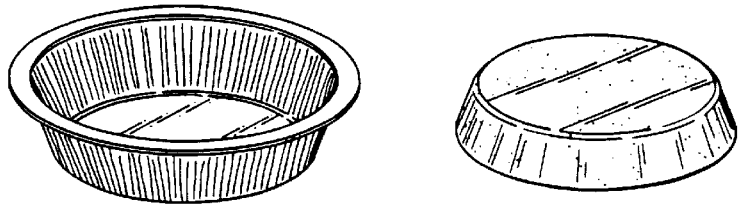

FIGS. 12A–C illustrate the ability to utilized complex shaped molds for producing complex shaped foam. In one case, shown in FIG. 12A the top of a soda can was removed and the remaining can used as a mold. No release agent was utilized. Note that the shape of the resulting part conforms to the shape of the soda can, even after graphitization to 2800° C. This demonstrates the dimensional stability of the foam and the ability to produce near net shaped parts.

In the second case, as shown in FIGS. 12B and C employing an aluminum weight dish, a very smooth surface was formed on the surface contacting the aluminum. This is directly attributable to the fact that the molten pitch does not wet the surface of the aluminum. This would allow one to produce complex shaped parts with smooth surfaces so as to improve contact area for bonding or improving heat transfer. This smooth surface will act as a face sheet and, thus, a foam-core composite can be fabricated in-situ with the fabrication of the face sheet. Since it is fabricated together and an integral material no interface joints result, thermal stresses will be less, resulting in a stronger material.

The following examples illustrate the production of a composite material employing the foam of this invention.

EXAMPLE III

Figure 13A:
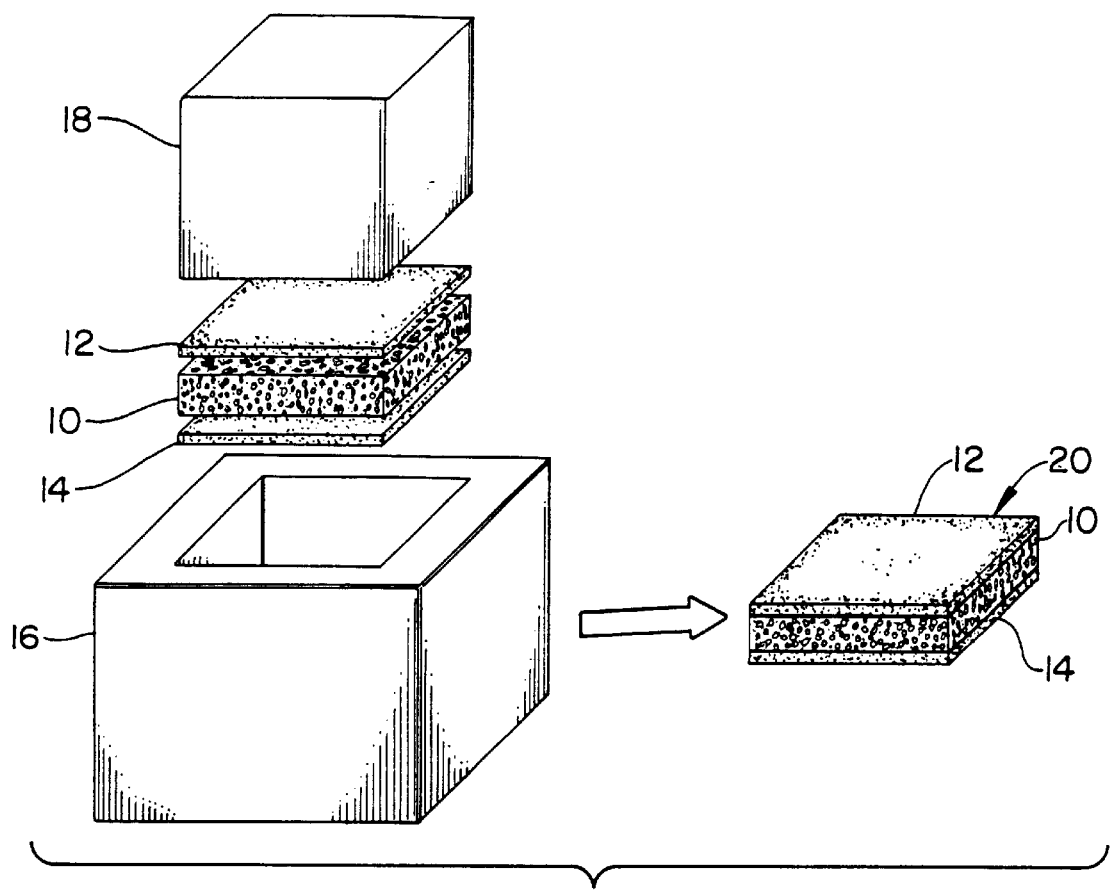
FIG. 13A is a schematic view illustrating the production of a carbon foam composite made in accordance with this invention.
Figure 13B:
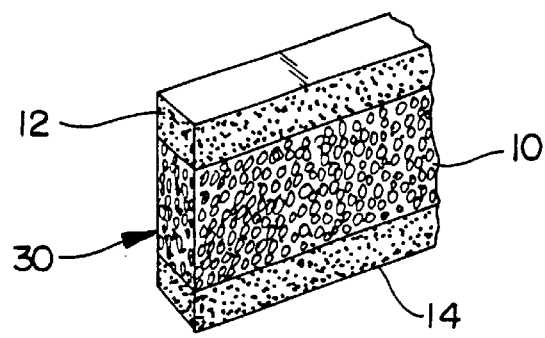
FIG. 13B is a perspective view of the carbon foam composite of this invention.

Pitch derived carbon foam was produced with the method described in Example I. Referring to FIG. 13A the carbon foam 10 was then machined into a block 2"×2"×½". Two pieces 12 and 14 of a prepeg comprised of Hercules AS4 carbon fibers and ICI Fibirite Polyetheretherkeytone thermoplastic resin also of 2"×2"×½" size were placed on the top and bottom of the foam sample, and all was placed in a matched graphite mold 16 for compression by graphite plunger 18. The composite sample was heated under an applied pressure of 100 psi to a temperature of 380° C. at a rate of 5° C./min. The composite was then heated under a pressure of 100 psi to a temperature of 650° C. The foam core sandwich panel generally 20 was then removed from the mold and carbonized under nitrogen to 1050° C. and then graphitized to 2800° C., resulting in a foam with carbon-carbon facesheets bonded to the surface. The composite generally 30 is shown in FIG. 13B.

EXAMPLE IV

Pitch derived carbon foam was produced with the method described in Example I. It was then machined into a block 2"×2"×½". Two pieces of carbon-carbon material, 2"×2"×½", were coated lightly with a mixture of 50% ethanol, 50% phenolic Durezc Resin available from Occidental Chemical Co. The foam block and carbon-carbon material were positioned together and placed in a mold as indicated in Example III. The sample was heated to a temperature of 150° C. at a rate of 5° C./min and soaked at temperature for 14 hours. The sample was then carbonized under nitrogen to 1050° C. and then graphitized to 2800° C., resulting in a foam with carbon-carbon facesheets the surface. This is also shown generally at 30 in FIG. 13B.

EXAMPLE V

Pitch derived carbon foam was produced with the method described in Example I. The foam sample was then densified with carbon by the method of chemical vapor infiltration for 100 hours. The density increased to 1.4 g/cm$^3$, the flexural strength was 19.5 MPa and the flexural modulus was 2300 MPa. The thermal conductivity of the raw foam was 58 W/m·K and the thermal conductivity of the densified foam was 94 W/m·K.

EXAMPLE VI

Pitch derived carbon foam was produced with the method described in Example I. The foam sample was then densified with epoxy by the method of vacuum impregnation. The epoxy was cured at 150° C. for 5 hours. The density increased to 1.37 g/cm$^3$ and the flexural strength was measured to be 19.3 MPa.

It is obvious that other materials, such as metals, ceramics, plastics, or fiber reinforced plastics could be bonded to the surface of the foam of this invention to produce a foam core composite material with acceptable properties. It is also obvious that ceramics, or glass, or other materials could be impregnated into the foam for densification.

Based on the data taken to date from the carbon foam material, several observations can be made and the important features of the invention are:

1. Pitch-based carbon foam can be produced without an oxidative stabilization step, thus saving time and costs.
2. High graphitic alignment in the struts of the foam is achieved upon graphitization to 2500° C., and thus high thermal conductivity and stiffness will be exhibited by the foam, making them suitable as a core material for thermal applications.
3. High compressive strengths should be achieved with mesophase pitch-based carbon foams, making them suitable as a core material for structural applications.
4. Foam core composites can be fabricated at the same time as the foam is generated, thus saving time and costs.
5. Rigid monolithic preforms can be made with significant open porosity suitable for densification by the Chemical Vapor Infiltration method of ceramic and carbon infiltrants.
6. Rigid monolithic preforms can be made with significant open porosity suitable for activation, producing a monolithic activated carbon.
7. It is obvious that by varying the pressure applied, the size of the bubbles formed during the foaming will change and, thus, the density, strength, and other properties can be affected.

The following alternative procedures and products can also be effected by the process of this invention:
1. Fabrication of preforms with complex shapes for densification by CVI or Melt Impregnation.
2. Activated carbon monoliths.
3. Optical absorbent.
4. Low density heating elements.
5. Firewall Material
6. Low secondary election emission targets for high-energy physics applications.

It will thus be seen that the present invention provides for the manufacture of pitch-based carbon foam for structural and thermal composites. The process involves the fabrication of a graphitic foam from a mesophase or isotropic pitch which can be synthetic, petroleum, or coal-tar based. A blend of these pitches can also be employed. The simplified process utilizes a high pressure high temperature furnace and thereby, does not require and oxidative stabilization step. The foam has a relatively uniform distribution of pore sizes ($\approx$100 microns), very little closed porosity, and density of approximately 0.53 g/cm$^3$. The mesophase pitch is stretched along the struts of the foam structure and thereby produces a highly aligned graphitic structure in the struts. These struts will exhibit thermal conductivities and stiffness similar to the very expensive high performance carbon fibers (such as P-120 and K1100). Thus, the foam will exhibit high stiffness and thermal conductivity at a very low density ($\approx$0.5 g/cc). This foam can be formed in place as a core material for high temperature sandwich panels for both thermal and structural applications, thus reducing fabrication time.

Utilizing an isotropic pitch, the resulting foam can be easily activated to produce a high surface area activated carbon. The activated carbon foam will not experience the problems associated with granules such as attrition, channeling, and large pressure drops.

What is claimed is:
1. A graphitic carbon foam characterized by an X-ray diffraction pattern as depicted in FIG. 11.
2. A graphitic carbon foam characterized by an X-ray diffraction pattern exhibiting doublet peaks at 2$\theta$ angles between 40 and 50 degrees.
3. A graphitic carbon foam characterized by an x-ray diffraction pattern having an average d002 spacing of about 0.336 nm, wherein the x-ray diffraction pattern exhibits doublet peaks at 2$\theta$ angles between 40 and 50 degrees.
4. A graphitic carbon foam characterized by an x-ray diffraction pattern, wherein the average d002 spacing is 0.336 nm.
5. A graphitic carbon foam as defined in claim 4 wherein the X-ray diffraction pattern exhibits doublet peaks at 2$\theta$ angles between 40 and 50 degrees.
6. A graphitic carbon foam having a specific thermal conductivity of at least about 109 W·cm$^3$/m·K·g.
7. A graphitic carbon foam as defined in claim 6 having a specific thermal conductivity from about 109 W·cm$^3$/m·K·g to about 200 W·cm$^3$/m·K·g.
8. A graphitic carbon foam having a specific thermal conductivity greater than four times that of copper.
9. A graphitic carbon foam as defined in claims 6, 7, or 8, characterized by an x-ray diffraction pattern as depicted in FIG. 11.
10. A graphitic carbon foam as defined in claims 6, 7, or 8, characterized by an x-ray diffraction pattern exhibiting doublet peaks at 2$\theta$ angles between 40 and 50 degrees.
11. A graphitic carbon foam as defined in claims 6 or 8, characterized by an x-ray diffraction pattern having an average d002 spacing of 0.336 nm.
12. A graphitic carbon foam characterized by an x-ray diffraction pattern as depicted in FIG. 11 and having a specific thermal conductivity greater than copper.
13. A graphitic carbon foam characterized by an x-ray diffraction pattern as depicted in FIG. 11 and having a bulk thermal conductivity from about 58 W/m·K to about 106 W/m·K.
14. A graphitic carbon foam characterized by an x-ray diffraction pattern as depicted in FIG. 11, the carbon foam having an open cell structure consisting essentially of ellipsoidal pores, said carbon foam having been derived from a pitch selected from the group consisting of synthetic mesophase pitch, synthetic isotropic pitch, petroleum-derived mesophase pitch, petroleum-derived isotropic pitch, and coal-tar-derived mesophase pitch.
15. A graphitic carbon foam characterized by an x-ray diffraction pattern as depicted in FIG. 11, said carbon foam having an open cell pore structure comprised of pores whose planar cross sectional images are circular or elliptical, said carbon foam having been derived from a pitch selected from the group consisting of synthetic mesophase pitch, synthetic isotropic pitch, petroleum-derived mesophase pitch, petroleum-derived isotropic pitch, and coal-tar-derived mesophase pitch.
16. A graphitic carbon foam characterized by an x-ray diffraction pattern as depicted in FIG. 11, wherein said carbon foam is non-oxidatively stabilized and of an open cell structure comprising cell walls wherein carbon in the form of graphite and derived from a mesophase pitch is aligned along the cell wall axes.
17. A graphitic carbon foam characterized by an x-ray diffraction pattern exhibiting doublet peaks at 2$\theta$ angles between 40 and 50 degrees and having a specific thermal conductivity greater than copper.
18. A graphitic carbon foam characterized by an x-ray diffraction pattern exhibiting doublet peaks at 2$\theta$ angles between 40 and 50 degrees and having a bulk thermal conductivity from about 58 W/m·K to about 106 W/m·K.
19. A graphitic carbon foam characterized by an x-ray diffraction pattern exhibiting doublet peaks at 2$\theta$ angles between 40 and 50 degrees, said carbon foam having an open cell pore structure consisting essentially of ellipsoidal pores, said carbon foam having been derived from a pitch selected from the group consisting of synthetic mesophase pitch, synthetic isotropic pitch, petroleum-derived mesophase pitch, petroleum-derived isotropic pitch, and coal-tar-derived mesophase pitch.
20. A graphitic carbon foam characterized by an x-ray diffraction pattern exhibiting doublet peaks at 2$\theta$ angles between 40 and 50 degrees, said carbon foam having an open cell pore structure comprised of pores whose planar cross sectional images are circular or elliptical, said carbon foam having been derived from a pitch selected from the group consisting of synthetic mesophase pitch, synthetic isotropic pitch, petroleum-derived mesophase pitch, petroleum-derived isotropic pitch, and coal-tar-derived mesophase pitch.

21. A graphitic carbon foam characterized by an x-ray diffraction pattern exhibiting doublet peaks at 2θ angles between 40 and 50 degrees, wherein said carbon foam is non-oxidatively stabilized and of an open cell structure comprising cell walls wherein carbon in the form of graphite and derived from a mesophase pitch is aligned along the cell wall axes.

22. A graphitic carbon foam characterized by an x-ray diffraction pattern having an average d002 spacing of 0.336 nm and having a specific thermal conductivity greater than copper.

23. A graphitic carbon foam characterized by an x-ray diffraction pattern having an average d002 spacing of 0.336 nm, said carbon foam having an open cell pore structure comprised of pores whose planar cross sectional images are circular or elliptical, said carbon foam having been derived from a pitch selected from the group consisting of synthetic mesophase pitch, synthetic isotropic pitch, petroleum-derived mesophase pitch, petroleum-derived isotropic pitch, and coal-tar-derived mesophase pitch.

24. A graphitic carbon foam having a specific thermal conductivity from about 109 W·cm³/m·K·g to about 200 W·cm³/m·K·g, said carbon foam having an open cell pore structure consisting essentially of ellipsoidal pores, and having been derived from a pitch selected from the group consisting of synthetic mesophase pitch, synthetic isotropic pitch, petroleum-derived mesophase pitch, petroleum-derived isotropic pitch, and coal-tar-derived mesophase pitch.

25. A graphitic carbon foam having a specific thermal conductivity from about 109 W·cm³/m·K·g to about 200 W·cm³/m·K·g, said carbon foam having an open cell pore structure comprised of pores whose planar cross sectional images are circular or elliptical, said carbon foam having been derived from a pitch selected from the group consisting of synthetic mesophase pitch, synthetic isotropic pitch, petroleum-derived mesophase pitch, petroleum-derived isotropic pitch, and coal-tar-derived mesophase pitch.

26. A graphitic carbon foam having a specific thermal conductivity from about 109 W·cm³/m·K·g to about 200 W·cm³/m·K·g, said carbon foam being non-oxidatively stabilized carbon foam of an open cell structure comprising cell walls wherein carbon in the form of graphite and derived from a mesophase pitch is aligned along the cell wall axes.

27. A graphitic carbon foam having a specific thermal conductivity greater than four times that of copper, said carbon foam having an open cell pore structure consisting essentially of ellipsoidal pores, said carbon foam having been derived from a pitch selected from the group consisting of synthetic mesophase pitch, synthetic isotropic pitch, petroleum-derived mesophase pitch, petroleum-derived isotropic pitch, and coal-tar-derived mesophase pitch.

28. A graphitic carbon foam having a specific thermal conductivity greater than four times that of copper, said carbon foam having an open cell pore structure comprised of pores whose planar cross sectional images are circular or elliptical, said carbon foam having been derived from a pitch selected from the group consisting of synthetic mesophase pitch, synthetic isotropic pitch, petroleum-derived mesophase pitch, petroleum-derived isotropic pitch, and coal-tar-derived mesophase pitch.

29. A graphitic carbon foam having a specific thermal conductivity greater than four times that of copper, said carbon foam being non-oxidatively stabilized and of an open cell structure comprising cell walls wherein carbon in the form of graphite and derived from a mesophase pitch is aligned along the cell wall axes.

30. A graphitic carbon foam having a bulk thermal conductivity from about 58 W/m·K to about 106 W/m·K and being characterized by an x-ray diffraction pattern as depicted in FIG. 11, said carbon foam having an open cell pore structure consisting essentially of ellipsoidal pores, said carbon foam having been derived from a pitch selected from the group consisting of synthetic mesophase pitch, synthetic isotropic pitch, petroleum-derived mesophase pitch, petroleum-derived isotropic pitch, and coal-tar-derived mesophase pitch.

31. A graphitic carbon foam having a bulk thermal conductivity from about 58 W/m·K to about 106 W/m·K and being characterized by an x-ray diffraction pattern as depicted in FIG. 11, said carbon foam having an open cell pore structure comprised of pores whose planar cross sectional images are circular or elliptical, said carbon foam having been derived from a pitch selected from the group consisting of synthetic mesophase pitch, synthetic isotropic pitch, petroleum-derived mesophase pitch, petroleum-derived isotropic pitch, and coal-tar-derived mesophase pitch.

32. A graphitic carbon foam having a bulk thermal conductivity from about 58 W/m·K to about 106 W/m·K and being characterized by an x-ray diffraction pattern as depicted in FIG. 11, said carbon foam being non-oxidatively stabilized and of an open cell structure comprising cell walls wherein carbon in the form of graphite and derived from a mesophase pitch is aligned along the cell wall axes.

33. A graphitic carbon foam having a specific thermal conductivity of at least about 109 W·cm³/m·K·g and being characterized by an x-ray diffraction pattern exhibiting doublet peaks at 2θ angles between 40 and 50 degrees, said carbon foam having an open cell pore structure consisting essentially of ellipsoidal pores, said carbon foam having been derived from a pitch selected from the group consisting of synthetic mesophase pitch, synthetic isotropic pitch, petroleum-derived mesophase pitch, petroleum-derived isotropic pitch, and coal-tar-derived mesophase pitch.

34. A graphitic carbon foam having a specific thermal conductivity of at least about 109 W·cm³/m·K·g and being characterized by an x-ray diffraction pattern exhibiting doublet peaks at 2θ angles between 40 and 50 degrees, said carbon foam having an open cell pore structure comprised of pores whose planar cross sectional images are circular or elliptical, said carbon foam having been derived from a pitch selected from the group consisting of synthetic mesophase pitch, synthetic isotropic pitch, petroleum-derived mesophase pitch, petroleum-derived isotropic pitch, and coal-tar-derived mesophase pitch.

35. A graphitic carbon foam having a specific thermal conductivity of at least about 109 W·cm³/m·K·g and being characterized by an x-ray diffraction pattern exhibiting doublet peaks at 2θ angles between 40 and 50 degrees, said carbon foam being non-oxidatively stabilized and of an open cell structure comprising cell walls wherein carbon in the form of graphite and derived from a mesophase pitch is aligned along the cell wall axes.

36. A graphitic carbon foam as defined in claims 33, 34, or 36, wherein the x-ray diffraction pattern has an average d002 spacing of 0.336 nm.

37. A graphitic carbon foam having a specific thermal conductivity from about 109 W·cm$^3$/m·K·g to about 200 W·cm$^3$/m·K·g and being characterized by an x-ray diffraction pattern having an average d002 spacing of about 0.336 nm, said carbon foam having an open cell pore structure consisting essentially of ellipsoidal pores, said carbon foam having been derived from a pitch selected from the group consisting of synthetic mesophase pitch, synthetic isotropic pitch, petroleum-derived mesophase pitch, petroleum-derived isotropic pitch, and coal-tar-derived mesophase pitch.

38. A graphitic carbon foam having a specific thermal conductivity from about 109 W·cm$^3$m·K·g to about 200 W·cm$^3$/m·K·g and being characterized by an x-ray diffraction pattern having an average d002 spacing of about 0.336 nm, said carbon foam having an open cell pore structure comprised of pores whose planar cross sectional images are circular or elliptical, said carbon foam having been derived from a pitch selected from the group consisting of synthetic mesophase pitch, synthetic isotropic pitch, petroleum-derived mesophase pitch, petroleum-derived isotropic pitch, and coal-tar-derived mesophase pitch.

39. A graphitic carbon foam having a specific thermal conductivity from about 109 W·cm$^3$m·K·g to about 200 W·cm$^3$/m·K·g and being characterized by an x-ray diffraction pattern having an average d002 spacing of about 0.336 nm, said carbon foam being non-oxidatively stabilized and of an open cell structure comprising cell walls wherein carbon in the form of graphite and derived from a mesophase pitch is aligned along the cell wall axes.

40. A graphitic carbon foam as defined in claims 37, 38, or 39, wherein the x-ray diffraction pattern exhibits doublet peaks at 2θ angles between 40 and 50 degrees.

41. A graphitic carbon foam having a specific thermal conductivity greater than four times that of copper and being characterized by an x-ray diffraction pattern having an average d002 spacing of 0.336 nm, said carbon foam having an open cell pore structure consisting essentially of ellipsoidal pores, said carbon foam having been derived from a pitch selected from the group consisting of synthetic mesophase pitch, synthetic isotropic pitch, petroleum-derived mesophase pitch, petroleum-derived isotropic pitch, and coal-tar-derived mesophase pitch.

42. A graphitic carbon foam having a specific thermal conductivity greater than four times that of copper and being characterized by an x-ray diffraction pattern having an average d002 spacing of 0.336 nm, said carbon foam having an open cell pore structure comprised of pores whose planar cross sectional images are circular or elliptical, said carbon foam having been derived from a pitch selected from the group consisting of synthetic mesophase pitch, synthetic isotropic pitch, petroleum-derived mesophase pitch, petroleum-derived isotropic pitch, and coal-tar-derived mesophase pitch.

43. A graphitic carbon foam having a specific thermal conductivity greater than four times that of copper and being characterized by an x-ray diffraction pattern having an average d002 spacing of 0.336 nm, said carbon foam being non-oxidatively stabilized and of an open cell structure comprising cell walls wherein carbon in the form of graphite and derived from a mesophase pitch is aligned along the cell wall axes.

44. A graphitic carbon foam as defined in claims 41, 42, or 43, wherein the x-ray diffraction pattern exhibits doublet peaks at 2θ angles between 40 and 50 degrees.

45. A graphitic carbon foam having a specific thermal conductivity greater than that of copper and being characterized by an x-ray diffraction pattern having an average d002 spacing of 0.336 nm, said carbon foam having an open cell pore structure consisting essentially of ellipsoidal pores, said carbon foam having been derived from a pitch selected from the group consisting of synthetic mesophase pitch, synthetic isotropic pitch, petroleum-derived mesophase pitch, petroleum-derived isotropic pitch, and coal-tar-derived mesophase pitch.

46. A graphitic carbon foam having a specific thermal conductivity greater than that of copper and being characterized by an x-ray diffraction pattern having an average d002 spacing of 0.336 nm, said carbon foam having an open cell pore structure comprised of pores whose planar cross sectional images are circular or elliptical, said carbon foam having been derived from a pitch selected from the group consisting of synthetic mesophase pitch, synthetic isotropic pitch, petroleum-derived mesophase pitch, petroleum-derived isotropic pitch, and coal-tar-derived mesophase pitch.

47. A graphitic carbon foam having a specific thermal conductivity greater than that of copper and being characterized by an x-ray diffraction pattern having an average d002 spacing of 0.336 nm, said carbon foam being non-oxidatively stabilized and of an open cell structure comprising cell walls wherein carbon in the form of graphite and derived from a mesophase pitch is aligned along the cell wall axes.

48. A graphitic carbon foam characterized by a specific thermal conductivity of at least about 109 W·cm$^3$/m·K·g and an x-ray diffraction pattern having an average d002 spacing of 0.336 nm, said foam being pitch-derived and non-oxidatively stabilized said foam being further characterized by an open cell pore structure comprised of ellipsoidal pores and by graphite aligned along the axes of the cell walls.

49. A graphitic carbon foam characterized by a specific thermal conductivity of at least about 109 W·cm$^3$/m·K·g and an x-ray diffraction pattern having an average d002 spacing of 0.336 nm, said carbon foam being a mesophase pitch-derived, non-oxidatively stabilized carbon foam characterized (1) by an open cell pore structure consisting essentially of pores whose planar cross sectional images are circular or elliptical and (2) by carbon aligned along the axes of the cell walls.

50. A graphitic carbon foam as defined in claims 48 or 49, wherein the x-ray diffraction pattern exhibits doublet peaks at 2θ angles between 40 and 50 degrees.

51. A graphitic carbon foam as defined in claim 50, derived from a pitch selected from the group consisting of petroleum-derived mesophase pitch and synthetic mesophase pitch.

52. A graphitic carbon foam as defined in claim 50, wherein the specific thermal conductivity is between about 109 W·cm$^3$/m·K·g and 200 W·cm$^3$/m·K·g.

53. A graphitic carbon foam as defined in claim 52, derived from a petroleum mesophase pitch.

54. A graphitic carbon foam derived from a pitch selected from the group consisting of petroleum-derived mesophase pitch, coal-tar-derived mesophase pitch, and synthetic mesophase pitch, said carbon foam being further characterized by a specific thermal conductivity greater than four times that of copper and an x-ray diffraction pattern as depicted in FIG. 11, said foam being non-oxidatively stabilized and further characterized by an open cell pore structure comprised of ellipsoidal pores and by graphite aligned along the axes of the cell walls.

55. A graphitic carbon foam derived from a pitch selected from the group consisting of petroleum-derived mesophase pitch, coal-tar-derived mesophase pitch, and synthetic mesophase pitch, said carbon foam being freer characterized by a specific thermal conductivity greater than four times that of copper and an x-ray diffraction pattern as depicted in FIG. 11, said foam being non-oxidatively stabilized carbon foam and characterized (1) by an open cell pore structure consisting essentially of pores whose planar cross sectional images are circular or elliptical and (2) by carbon aligned along the axes of the cell walls.

56. A graphitic carbon foam wherein the x-ray diffraction pattern exhibits doublet peaks at 2θ angles between 40 and 50 degrees, said foam having a bulk thermal conductivity from about 58 W/m·K to about 106 W/m·K and an x-ray diffraction pattern having an average d002 spacing of about 0.336 nm, said foam being pitch-derived and non-oxidatively stabilized and further characterized by an open cell pore structure comprised of ellipsoidal pores and by graphite aligned along the axes of the cell walls.

57. A graphitic carbon foam wherein the x-ray diffraction pattern exhibits doublet peaks at 2θ angles between 40 and 50 degrees, said foam having a bulk thermal conductivity from about 58 W/m·K to about 106 W/m·K and an x-ray diffraction pattern having an average d002 spacing of about 0.336 nm, said foam being mesophase pitch-derived, non-oxidatively stabilized and characterized (1) by an open cell pore structure consisting essentially of pores whose planar cross sectional images are circular or elliptical and (2) by carbon aligned along the axes of the cell walls.

58. A graphitic carbon foam as defined in claim 56 or 57, derived from a petroleum mesophase pitch.

59. A graphitic carbon foam having a specific thermal conductivity of at least 109 W·cm$^3$/m·K·g, said carbon foam having an open cell pore structure consisting essentially of ellipsoidal pores, said carbon foam having been derived from a pitch selected from the group consisting of synthetic mesophase pitch, synthetic isotropic pitch, petroleum-derived mesophase pitch, petroleum-derived isotropic pitch, and coal-tar-derived mesophase pitch.

60. A graphitic carbon foam having a specific thermal conductivity of at least 109 W·cm$^3$/m·K·g, said carbon foam having an open cell pore structure comprised of pores whose planar cross sectional images are circular or elliptical, said carbon foam having been derived from a pitch selected from the group consisting of synthetic mesophase pitch, synthetic isotropic pitch, petroleum-derived mesophase pitch, petroleum-derived isotropic pitch, and coal-tar-derived mesophase pitch.

61. A graphitic carbon foam having a specific thermal conductivity of at least 109 W·cm$^3$/m·K·g, wherein the carbon foam is a non-oxidatively stabilized carbon foam of an open cell structure comprising cell walls wherein carbon in the form of graphite and derived from a mesophase pitch is aligned along the cell wall axes.

62. A graphitic carbon foam as defined in claims 45, 46, or 47, wherein the x-ray diffraction pattern exhibits doublet peaks at 2θ angles between 40 and 50degrees.

63. A graphitic carbon foam as defined in claims 48 or 49, derived from a pitch selected from the group consisting of petroleum-derived mesophase pitch, coal-tar-derived mesophase pitch, and synthetic mesophase pitch.

64. A graphitic carbon foam characterized by a specific thermal conductivity greater than four times that of copper and an x-ray diffraction pattern as depicted in FIG. 11, said foam being pitch-derived, non-oxidatively stabilized, and further characterized by an open cell pore structure comprised of ellipsoidal pores and by graphite aligned along the axes of the cell walls.

65. A graphitic carbon foam further characterized by a specific thermal conductivity greater than four times that of copper and an x-ray diffraction pattern as depicted in FIG. 11, said foam being mesophase pitch-derived, non-oxidatively stabilized and characterized (1) by an open cell pore structure consisting essentially of pores whose planar cross sectional images are circular or elliptical and (2) by carbon aligned along the axes of the cell walls.

* * * * *